(12) United States Patent
Utsunomiya

(10) Patent No.: US 9,612,509 B2
(45) Date of Patent: Apr. 4, 2017

(54) VIBRATING BODY MOUNTING STRUCTURE AND PROJECTION-TYPE IMAGE DISPLAY DEVICE INCLUDING SAME

(71) Applicant: NEC Display Solutions, Ltd., Tokyo (JP)

(72) Inventor: Motoyasu Utsunomiya, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 38 days.

(21) Appl. No.: 14/428,954

(22) PCT Filed: Sep. 20, 2012

(86) PCT No.: PCT/JP2012/074017
§ 371 (c)(1),
(2) Date: Mar. 17, 2015

(87) PCT Pub. No.: WO2014/045364
PCT Pub. Date: Mar. 27, 2014

(65) Prior Publication Data
US 2015/0219183 A1    Aug. 6, 2015

(51) Int. Cl.
*G03B 21/16* (2006.01)
*F16F 15/00* (2006.01)
(Continued)

(52) U.S. Cl.
CPC .............. *G03B 21/16* (2013.01); *F16F 15/00* (2013.01); *F16F 15/073* (2013.01);
(Continued)

(58) Field of Classification Search
CPC ........ F16F 15/00; F16F 15/073; F16F 15/085; F16M 13/02; G03B 21/16; G03B 21/204; G03B 33/08
See application file for complete search history.

(56) References Cited

U.S. PATENT DOCUMENTS

| | | | |
|---|---|---|---|
| 2010/0157529 A1* | 6/2010 | Yoon | G03G 15/60 361/690 |
| 2010/0220394 A1* | 9/2010 | Kawai | H04N 5/232 359/508 |
| 2010/0238412 A1* | 9/2010 | Kurosaki | G03B 21/204 353/31 |

FOREIGN PATENT DOCUMENTS

| | | |
|---|---|---|
| JP | S62-164213 U | 10/1987 |
| JP | 2002-338018 A | 11/2002 |

(Continued)

OTHER PUBLICATIONS

International Search Report (ISR) (PCT Form PCT/ISA/210), in PCT/JP2012/074017, dated Nov. 13, 2012.

(Continued)

*Primary Examiner* — Sultan Chowdhury
*Assistant Examiner* — Magda Cruz
(74) *Attorney, Agent, or Firm* — McGinn IP Law Group, PLLC.

(57) ABSTRACT

Provided is a vibrating body mounting structure capable of reducing vibrations generated from a plurality of vibrating bodies. Vibrating body mounting structure (48) includes base member (40), a plurality of retaining members (39, 45), and connecting damper (49). The retaining members include first portions (39a, 45a) secured to the base member, and second portions (39b, 45b) adjacent to the first portions and retaining vibrating bodies (24, 25). The connecting damper connects second portion (39b) of one retaining member (39) of the plurality of retaining members to second portion (45b) of the other retaining member (45) of the plurality of retaining members.

20 Claims, 11 Drawing Sheets

(51) Int. Cl.
  *G03B 21/20*  (2006.01)
  *G03B 33/08*  (2006.01)
  *F16F 15/073*  (2006.01)
  *F16F 15/08*  (2006.01)
  *F16M 13/02*  (2006.01)

(52) U.S. Cl.
  CPC ........... *F16F 15/085* (2013.01); *F16M 13/02* (2013.01); *G03B 21/204* (2013.01); *G03B 33/08* (2013.01)

(56) References Cited

FOREIGN PATENT DOCUMENTS

| | | |
|---|---|---|
| JP | 2003-323789 A | 11/2003 |
| JP | 2006-047373 A | 2/2006 |
| JP | 2006-330300 A | 12/2006 |
| JP | 2007-248894 A | 9/2007 |
| JP | 2008-190434 A | 8/2008 |
| JP | 2008-547056 A | 12/2008 |
| JP | 2009-052569 A | 3/2009 |
| JP | 2010-086815 A | 4/2010 |
| JP | 2010-121540 A | 6/2010 |
| JP | 2010-237443 A | 10/2010 |
| JP | 2011-145681 A | 7/2011 |
| JP | 2011-234681 A | 11/2011 |
| JP | 4900736 B | 3/2012 |
| JP | 2012-164243 A | 8/2012 |

OTHER PUBLICATIONS

Japanese Office Action dated Dec. 8, 2015 with a partial English translation thereof.

\* cited by examiner

VIBRATING BODY MOUNTING STRUCTURE AND PROJECTION-TYPE IMAGE DISPLAY DEVICE INCLUDING SAME

TECHNICAL FIELD

The present invention relates to a structure for mounting a plurality of vibrating bodies and a projection-type image display device including the same.

BACKGROUND ART

The projection-type image display device is widely used for purposes ranging from a personal theater to business presentations. An example of the projection-type image display device is disclosed in JP 49007436 B2 (hereinafter referred to as "Patent Literature 1").

The projection-type image display device disclosed in Patent Literature 1 will be described with reference to FIGS. 1A to 1D.

FIG. 1A is a plan view schematically showing the interior of a projection-type image display device disclosed in Patent Literature 1. As shown in FIG. 1A, projection-type image display device 1 disclosed in Patent Literature 1 includes light source unit 2 configured to emit light, and image projection unit 3 configured to form an image, by using the light emitted from light source unit 2, and to project the image. Light source unit 2 and image projection unit 3 are attached to base member 4.

FIG. 1B is an enlarged plan view of light source unit 2 shown in FIG. 1A. As shown in FIG. 1B, light source unit 2 includes laser light source 5 configured to emit blue laser beam, and fluorescent wheel unit 6 configured to convert the blue laser beam emitted from laser light source 5 into red light and green light. FIG. 1C is a front view of fluorescent wheel unit 6 shown in FIG. 1B, and FIG. 1D is a schematic sectional view of fluorescent wheel unit 6 shown in FIG. 1B.

As shown in FIGS. 1B, 1C, and 1D, fluorescent wheel unit 6 includes fluorescent wheel 10 in which phosphors 8 and 9 are applied on circular substrate 7, and motor 11 for rotating fluorescent wheel 10. Red light is emitted from phosphor 8 when phosphor 8 is irradiated with a laser beam, and green light is emitted from phosphor 9 when phosphor 9 is irradiated with a laser beam. Fluorescent wheel 10 includes transmission region 12 for transmitting the laser beam.

By irradiating phosphors 8 and 9 and transmission region 12 of rotating fluorescent wheel 10 with the laser beam emitted from laser light source 5, red and green fluorescent lights and a blue laser beam are obtained. Image projection unit 3 (see FIG. 1A) forms an image by using the red, green, and blue lights obtained by means of fluorescent wheel unit 6, and projects the image.

JP 2010-86815 A (hereinafter referred to as "Patent Literature 2") discloses a projection-type image display device including a light source unit different from light source unit 2 disclosed in Patent Literature 1. The projection-type image display device disclosed in Patent Literature 2 will be described with reference to FIGS. 2A and 2B. Components identical to those shown in FIG. 1A are denoted by identical reference numerals, and description thereof will be omitted.

FIG. 2A is a plan view schematically showing the interior of the projection-type image display device disclosed in Patent Literature 2. As shown in FIG. 2A, projection-type image display device 13 disclosed in Patent Literature 2 includes light source unit 14 and image projection unit 3 that are attached to base member 4. FIG. 2B is an enlarged plan view of light source unit 14 shown in FIG. 2A.

As shown in FIG. 2B, light source unit 14 includes laser light sources 15a, 15b, and 15c, and fluorescent wheel units 16a, 16b, and 16c.

Fluorescent wheel unit 16a includes fluorescent wheel 19a in which phosphor 17a, that emits blue light when phosphor 17a is irradiated with a laser beam, is applied on circular substrate 18a, and motor 20a for rotating fluorescent wheel 19a. By irradiating phosphor 17a of rotating fluorescent wheel 19a with the laser beam emitted from laser light source 15a, blue light is obtained.

Similarly, fluorescent wheel unit 16b includes fluorescent wheel 19b in which phosphor 17b, that emits green light when phosphor 17b is irradiated with a laser beam, is applied on circular substrate 18b, and motor 20b for rotating fluorescent wheel 19b. Fluorescent wheel unit 16c includes fluorescent wheel 19c in which phosphor 17c, that emits red light when phosphor 17c is irradiated with a laser beam, is applied on circular substrate 18c, and motor 20c for rotating fluorescent wheel 19c. By irradiating phosphors 17b and 17c of rotating fluorescent wheels 19b and 19 with the laser beams emitted from laser light sources 15b and 15c, green and blue lights are obtained.

Light source unit 14 further includes dichroic mirror 21a for reflecting the green light and transmitting the blue light, and dichroic mirror 21b for reflecting the red light and transmitting the blue and green lights.

Dichroic mirror 21a is disposed at a position where the blue light obtained by means of fluorescent wheel unit 16a and the green light obtained by means of fluorescent wheel unit 16b intersect each other. The green light from fluorescent wheel unit 16b is reflected by dichroic mirror 21a, and the traveling direction of the green light is changed into the traveling direction of the blue light from fluorescent wheel unit 16a.

Dichroic mirror 21b is disposed at a position where the blue light obtained by means of fluorescent wheel unit 16a and the red light obtained by means of fluorescent wheel unit 16c intersect each other. The red light from fluorescent wheel unit 16c is reflected by dichroic mirror 21b, and the traveling direction of the red light is changed into the traveling direction of the blue light from fluorescent wheel unit 16a.

Image projection unit 3 (see FIG. 2A) forms an image, by using the blue, green, and red lights that are obtained by means of fluorescent wheel units 16a, 16b, and 16c, and projects the image.

A reason for rotating fluorescent wheels 10, 19a, 19b, and 19c shown in FIGS. 1B and 2B is to prevent a reduction in fluorescence conversion efficiency and thermal damage of phosphors 8, 9, 17a, 17b, and 17c.

For example, when a part of phosphor 17a is irradiated with the laser beam from laser light source 15a for a long period of time, the temperature of the part rises. When the temperature exceeds a predetermined value, a phenomenon that is known as thermal saturation occurs in which the amount of fluorescent light, that is emitted from phosphor 17a, is reduced. When the temperature of that part of phosphor 17a further rises, the part may be burned. By rotating fluorescent wheel 19a, the energy of the laser beam is distributed over the entire area of phosphor 17a, thereby preventing a partial reduction in fluorescence conversion efficiency and preventing phosphor 17a from burning.

The temperature at which thermal saturation occurs varies among phosphor 17a that emits the blue light, phosphor 17b that emits the green light, and phosphor 17c that emits the red light. JP 2011-145681 A (hereinafter referred to as "Patent Literature 3") discloses a projection-type image display device designed to control the numbers of rotations of fluorescent wheels 19a, 19b, and 19c according to the thermal saturation characteristics of phosphors 17a, 17b, and 17c.

Recently, a light source unit has been proposed that includes a fluorescent wheel unit configured to convert a laser beam into yellow light, and a color wheel unit configured to divide the yellow light into red light, blue light, and yellow light. The color wheel unit includes a color wheel in which a plurality of color filters is arrayed on a circular substrate to transmit predetermined color light, and a motor for rotating the color wheel.

By irradiating the rotating color wheel with yellow light, red, green, blue, and yellow lights are obtained. A phosphor that emits yellow light has high fluorescence conversion efficiency and excellent thermal saturation characteristics. The use of the phosphor that emits yellow light allows the luminance of the light source unit to be further increased.

CITATION LIST

Patent Literature

Patent Literature 1: JP 4900736 B2
Patent Literature 2: JP 2010-86815 A
Patent Literature 3: JP 2011-145681 A

SUMMARY OF INVENTION

Technical Problem

Vibration occurs when the fluorescent wheel unit or the color wheel unit is driven. The projection-type image display device including a plurality of vibrating bodies, such as the fluorescent wheel unit and the color wheel unit, has the following problems.

In the projection-type image display devices disclosed in Patent Literatures 2 and 3, vibrations generated from the fluorescent wheel units may resonate with each other, and therefore each of the fluorescent wheel units may vibrate with greater amplitude. When the vibrations are amplified, louder noise may be generated. The amplified vibrations may also damage the fluorescent wheel unit, resulting in the shortening of the life cycle of the projection-type image display device.

Even in a projection-type image display device including one fluorescent wheel unit and one color wheel unit, vibrations generated from the fluorescent wheel unit and the color wheel unit may resonate with each other. This may also result in the generation of noise or the shortening of the life cycle of the projection-type image display device.

The projection-type image display device including one fluorescent wheel unit (see Patent Literature 1) may also include a fan for cooling the fluorescent wheel unit and the laser light source. The resonance of vibrations generated when the fluorescent wheel unit and the fan are rotated may generate noise or shorten the life cycle of the projection-type image display device.

For these reasons, vibrations from the plurality of vibrating bodies, such as the fluorescent wheel unit, the color wheel unit, or the fan, must be reduced.

It is therefore an object of the present invention to provide a vibrating body mounting structure capable of reducing vibrations generated from a plurality of vibrating bodies, and a projection-type image display device including the same.

Solution to Problem

One aspect of the present invention is directed to a structure for mounting a plurality of vibrating bodies. According to this aspect, the vibrating body mounting structure includes a base member, a plurality of retaining members, and a connecting damper. The plurality of retaining members includes first portions secured to the base member, and second portions adjacent to the first portions and retaining the vibrating bodies. The connecting damper connects the second portion of one retaining member of the plurality of retaining members to the second portion of the other retaining member of the plurality of retaining members.

Advantageous Effects of Invention

According to the present invention, vibrations generated from the plurality of vibrating bodies can be reduced.

DESCRIPTION OF EMBODIMENTS

Next, embodiments of the present invention will be described with reference to the drawings.

First Embodiment

First, a projection-type image display device including a vibrating body mounting structure according to a first embodiment of the present invention will be described with reference to FIGS. 3A to 3C. According to this embodiment, the device includes a fluorescent wheel unit configured to convert a laser beam into yellow light, and a color wheel unit configured to divide the yellow light into red light, green light, blue light, and yellow light. However, the present invention is not limited to such a projection-type image display device.

Figure 1A:
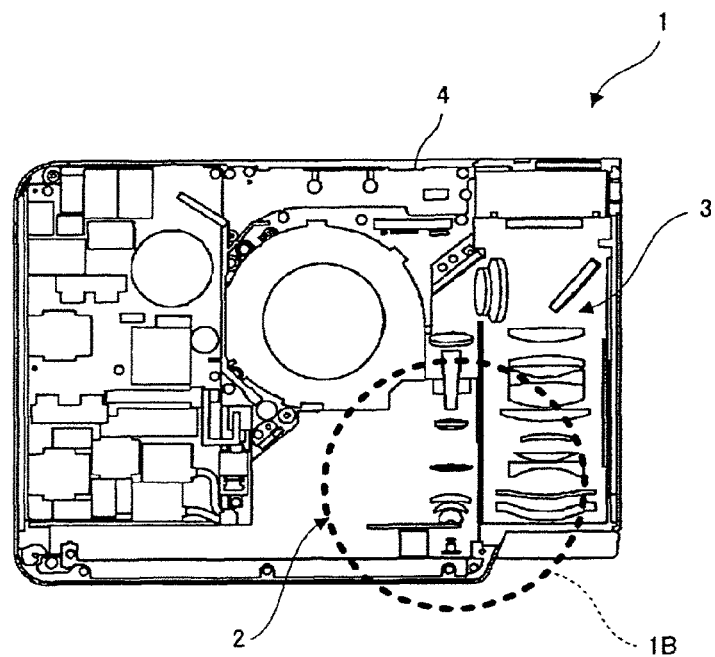
FIG. 1A is a plan view schematically showing the interior of a projection-type image display device disclosed in Patent Literature 1.
Figure 1B:
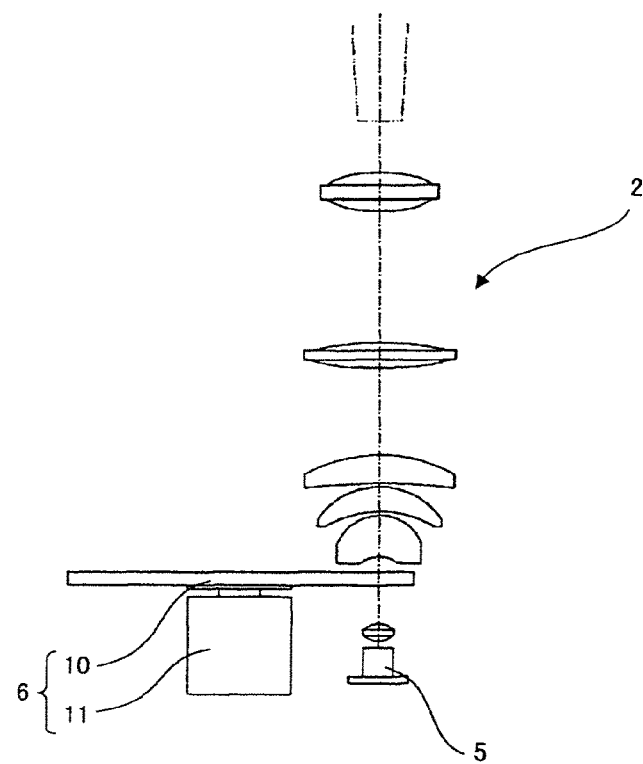
FIG. 1B is an enlarged plan view of a light source unit shown in FIG. 1A.
Figure 1C:
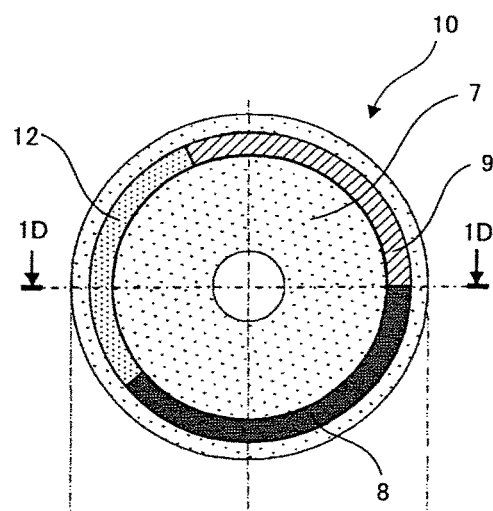
FIG. 1C is a front view of a fluorescent wheel shown in FIG. 1B.
Figure 1D:
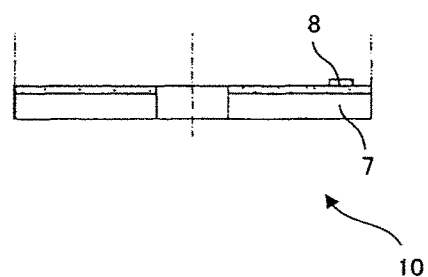
FIG. 1D is a schematic sectional view of the fluorescent wheel shown in FIG. 1B.
Figure 2A:
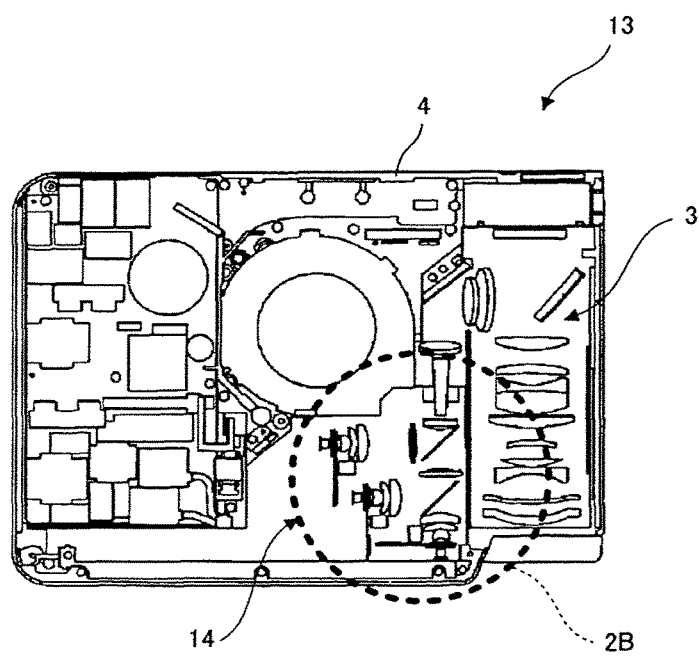
FIG. 2A is a plan view schematically showing the interior of a projection-type image display device disclosed in Patent Literature 2.
Figure 2B:
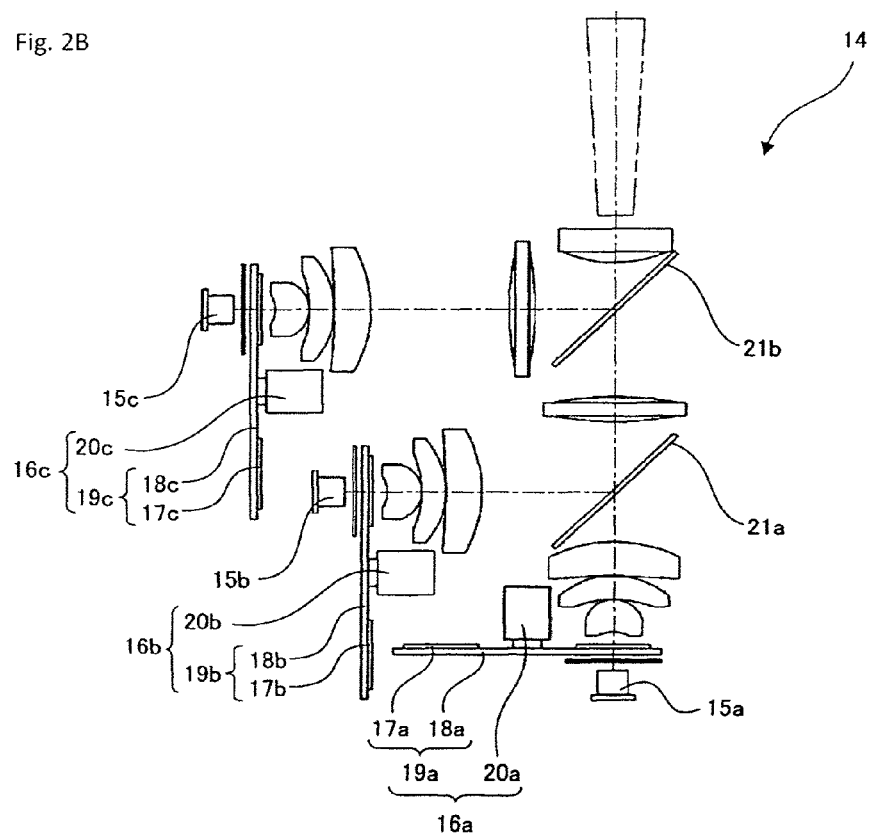
FIG. 2B is an enlarged plan view of a light source unit shown in FIG. 2A.
Figure 3A:
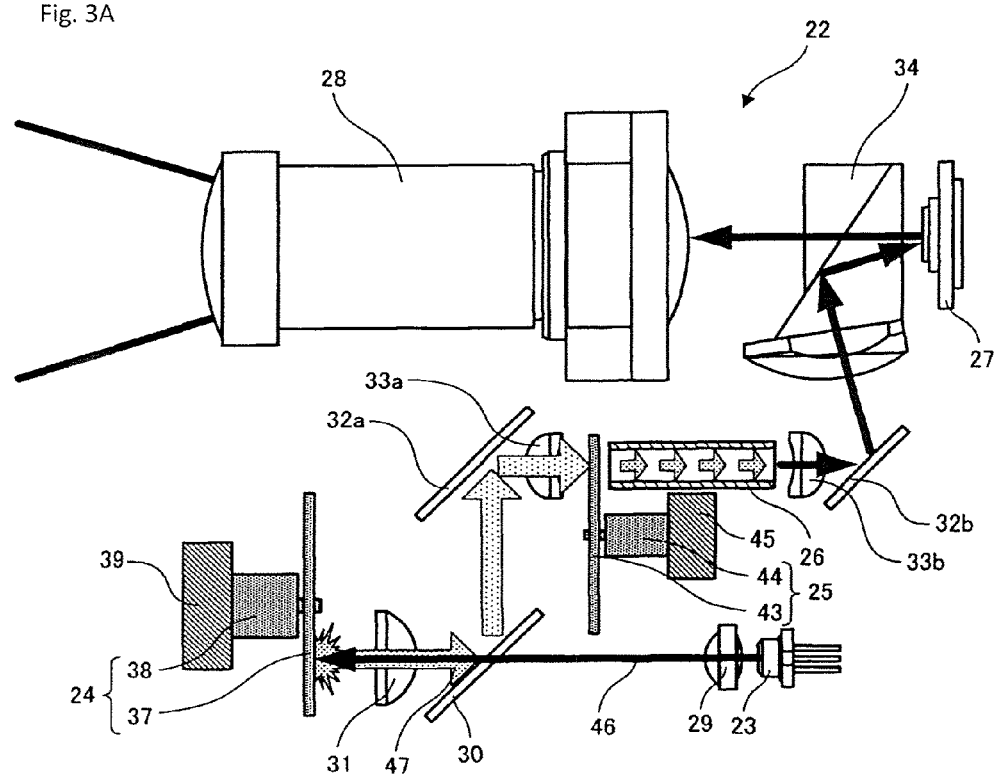
FIG. 3A is a plan view schematically showing a projection-type image display device including a vibrating body mounting structure according to the first embodiment of the present invention.

FIG. 3A is a plan view schematically showing the projection-type image display device according to this embodiment. In FIG. 3A, a connecting damper described below is not shown. Projection-type image display device 22 according to this embodiment includes light source unit 23, fluorescent wheel unit 24, color wheel unit 25, light tunnel 26, DMD (Digital Mirror Device) 27, and projection lens 28.

Collimator lens 29, dichroic mirror 30, and condenser lens 31 are arranged between light source unit 23 and fluorescent wheel unit 24. A pair of reflection mirrors 32a and 32b and a pair of condenser lenses 33a and 33b are arranged at the front and rear of color wheel unit 25 and light tunnel 26. Total internal reflection prism 34 is disposed between DMD 27 and projection lens 28.

Figure 3B:
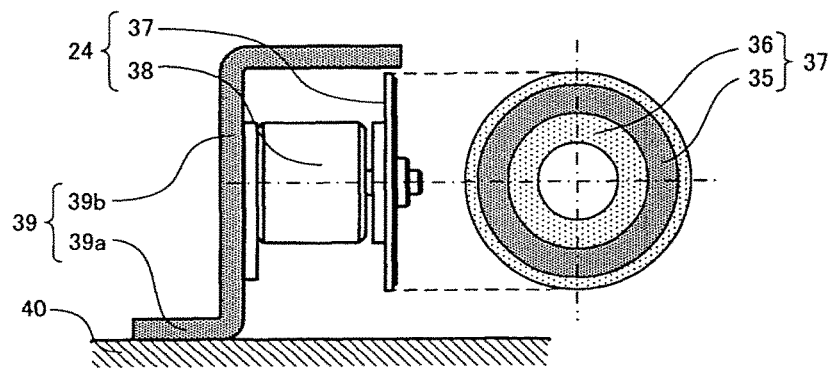
FIG. 3B is a diagram showing the periphery of a fluorescent wheel unit.
Figure 3C:
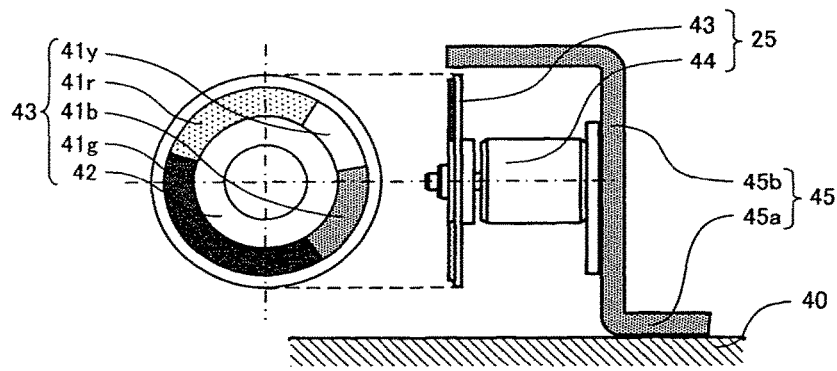
FIG. 3C is a diagram showing the periphery of a color wheel unit.

FIG. 3B is a diagram showing the periphery of fluorescent wheel unit 24, and FIG. 3C is a diagram showing the periphery of color wheel unit 25.

As shown in FIG. 3B, fluorescent wheel unit 24 includes fluorescent wheel 37 in which phosphor 35 is applied on circular substrate 36, and motor 38 for rotating fluorescent wheel 37. Fluorescent wheel unit 24 is retained on base member 40 of projection-type image display device 22 by means of first retaining member 39.

As shown in FIG. 3C, color wheel unit 25 includes color wheel 43 in which a plurality of color filters 41r, 41g, 41b, and 41y are arranged in a concentric fan shape on circular substrate 42, and motor 44 for rotating color wheel 43. Color filters 41r, 41g, 41b, and 41y are filters, each of which transmits predetermined color light, and are formed by depositing dielectric multilayer films.

Color wheel unit 25 is retained on base member 40 of projection-type image display device 22 by means of second retaining member 45.

The operation of projection-type image display device 22 will be described with reference to FIGS. 3A to 3C.

Laser beam 46 emitted from laser light source 23 passes through collimator lens 29 and dichroic mirror 30, and is applied to fluorescent wheel 37 through condenser lens 31. Phosphor 35 of fluorescent wheel 37 is excited by laser beam 46 to emit fluorescent light (e.g., yellow fluorescent light) 47 having a wavelength different from that of laser beam 46.

Fluorescent light 47 passes through condenser lens 31 and reaches reflection mirror 32a via dichroic mirror 30. Then, fluorescent light 47 is reflected by reflection mirror 32a and is applied to color wheel 43 through condenser lens 33a. Fluorescent light 47 is separated into red light, green light, blue light, and yellow light according to color filters 41r, 41g, 41b, and 41y. These color lights are converted into rectangular light fluxes uniform in illuminance by light tunnel 26.

The rectangular light fluxes are applied to DMD 27 via condenser lens 33b, reflection mirror 32b, and total internal reflection prism 34. The rectangular light fluxes are then modulated according to an image signal to be image light. The image light enters projection lens 28 via total internal reflection prism 34, and is magnified and projected onto a screen (not shown).

The projection-type image display device that uses DMD 27 as a spatial light modulation element, light tunnel 26 as an optical integrator, and total internal reflection prism 34 as a beam separation element has been described herein. However, the present invention is not limited to this example. For example, a liquid crystal panel may be used as a spatial light modulation element, a fly-eye lens may be used as an optical integrator, and a field lens or a mirror may be used as a beam separation element.

Furthermore, in an example shown in FIG. 3A, laser beam 46 is all applied to phosphor 35 and generated fluorescent light 47 is separated into the red light, the green light, the blue light, and the yellow light by color wheel 43. However, the present invention is not limited to this example.

For example, laser light source 23 may be a light source that emits a blue laser beam, and a part of fluorescent wheel 37 may be a fan-shaped reflection mirror. According to this example, a part of blue laser beam 46 that is applied to fluorescent wheel 37 is reflected by the reflection mirror to pass through color wheel 43. Then, the red, green, and yellow fluorescent lights and the blue laser beam are combined to form hybrid light by means of light tunnel 26. The hybrid light is modulated by DMD 27 to be image light.

Figure 4:
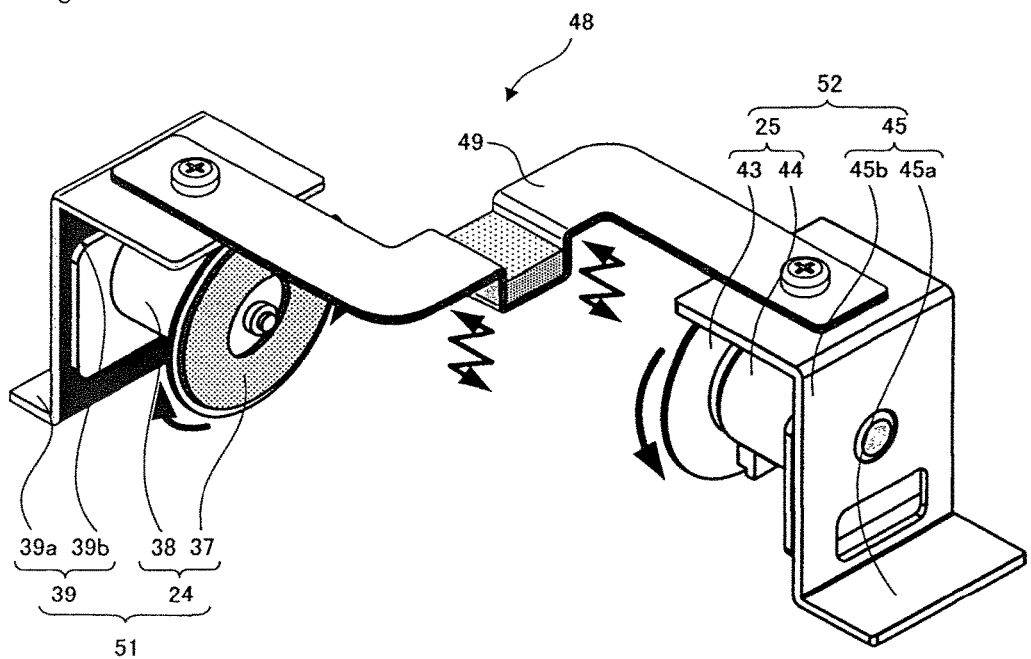
FIG. 4 is a perspective view of the vibrating body mounting structure according to the first embodiment of the present invention.

FIG. 4 is a perspective view of the vibrating body mounting structure according to this embodiment. In FIG. 4, base member 40 is not shown. As shown in FIG. 4, vibrating body mounting structure 48 according to this embodiment further includes connecting damper 49 connecting first retaining member 39 to second retaining member 45.

More specifically, first retaining member 39 includes first portion 39a secured to base member 40, and second portion 39b that is adjacent to first portion 39a and that retains fluorescent wheel unit 24. Second retaining member 45 includes first portion 45a secured to base member 40, and second portion 45b that is adjacent to first portion 45a and that retains color wheel unit 25. Connecting damper 49 connects second portion 39b to second portion 45b.

Figure 5:
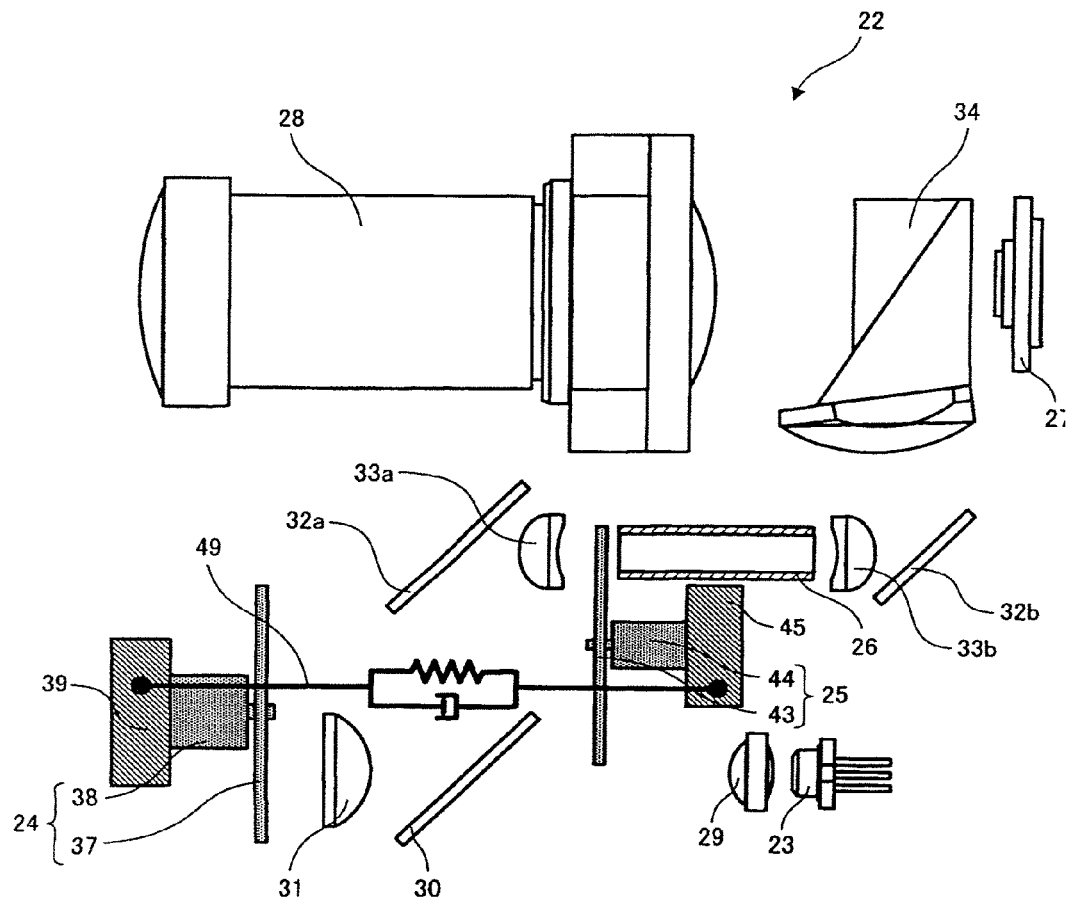
FIG. 5 is a diagram schematically showing a connecting damper that is added to the plan view shown in FIG. 3A.

FIG. 5 is a diagram schematically showing connecting damper 49 that is added to the plan view shown in FIG. 3A. As shown in FIG. 5, connecting damper 49 is a member including a spring element and a damping element.

Now, examples of first and second retaining members 39 and 45 will be described with reference to FIGS. 6A, 6B, 7A, 7B, 8A, and 8B. Since second retaining member 45 may have the same structure as that of first retaining member 39, only first retaining member 39 will be described hereinafter.

Figure 6A:
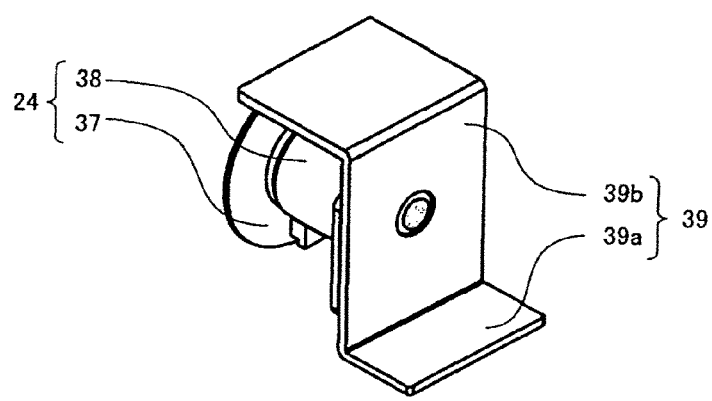
FIG. 6A is a perspective view showing an example of a retaining member.
Figure 6B:
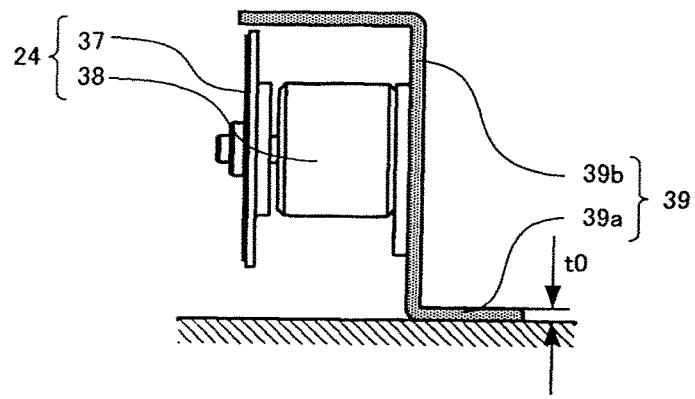
FIG. 6B is a side view of the retaining member shown in FIG. 6A.

FIG. 6A is a perspective view showing an example of first retaining member 39, and FIG. 6B is a side view of first retaining member 39 shown in FIG. 6A. In the example shown in FIGS. 6A and 6B, first retaining member 39 is one plate member having a thickness t0.

Figure 7A:
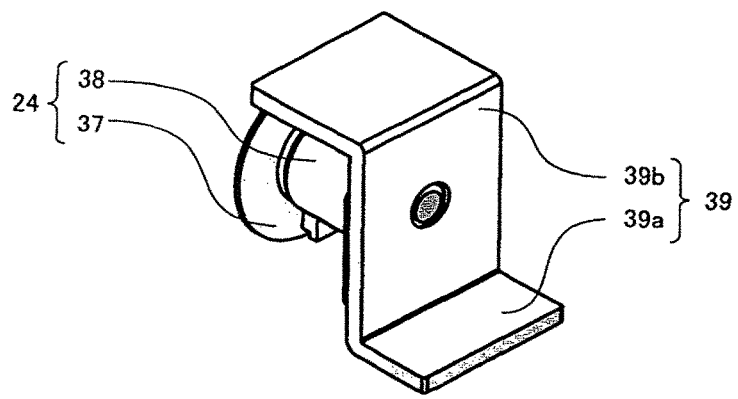
FIG. 7A is a perspective view showing another example of the retaining member.
Figure 7B:
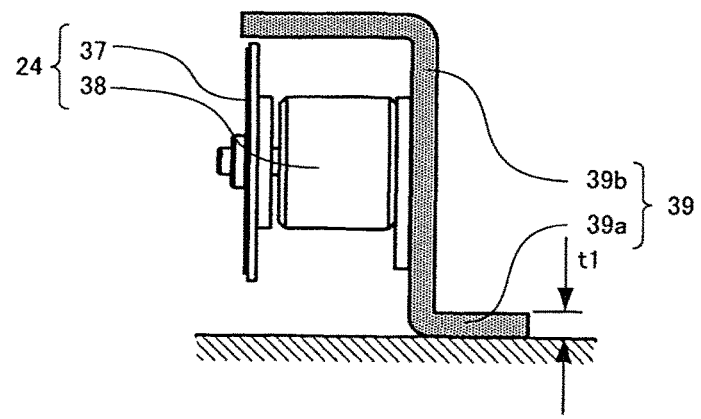
FIG. 7B is a side view of the retaining member shown in FIG. 7A.

FIG. 7A is a perspective view showing another example of first retaining member 39, and FIG. 7B is a side view of first retaining member 39 shown in FIG. 7A. In the example shown in FIGS. 7A and 7B, first retaining member 39 is one plate member having a thickness t1 larger than the thickness t0.

Figure 8A:
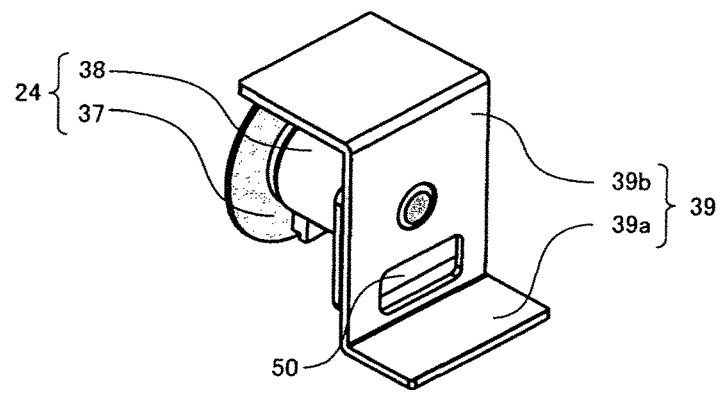
FIG. 8A is a perspective view showing another example of the retaining member.
Figure 8B:
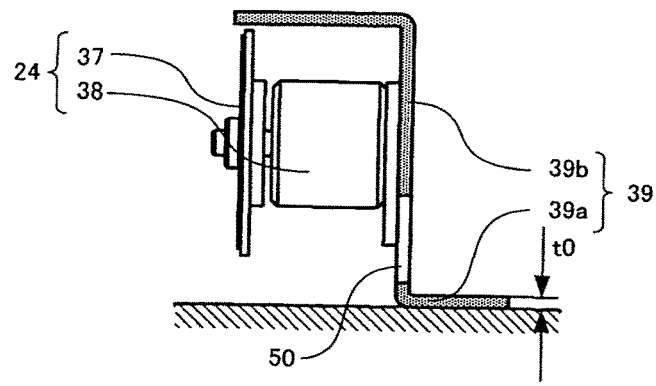
FIG. 8B is a side view of the retaining member shown in FIG. 8A.

FIG. 8A is a perspective view showing another example of first retaining member 39, and FIG. 8B is a side view of first retaining member 39 shown in FIG. 8A. In the example shown in FIGS. 8A and 8B, first retaining member 39 is a member in which opening 50 is formed in one plate member having a thickness t0.

In the examples shown in FIGS. 6A, 6B, 7A, 7B, 8A, and 8B, first retaining members 39 are made of the same material.

For second retaining member 45, one of the members shown in FIGS. 6A, 6B, 7A, 7B, 8A, and 8B is employed. However, second retaining member 45 is designed such that the natural frequency of first assembly 51 (see FIG. 4) that includes fluorescent wheel unit 24 and first retaining member 39 is different from the natural frequency of second assembly 52 that includes color wheel unit 25 and second retaining member 45.

The design examples of first and second retaining members 39 and 45 will be described with reference to FIGS. 4, 6A, 6B, 7A, and 7B.

A case where the mass of fluorescent wheel unit 24 is equal to that of color wheel unit 25 and where the number of rotations of fluorescent wheel 37 is equal to that of color wheel 43 will be discussed. In this case, for example, the plate member having the thickness t0 shown in FIGS. 6A and 6B is employed for first retaining member 39, and the plate member having the thickness t1 shown in FIGS. 7A and 7B is employed for second retaining member 45.

Since the plate member shown in FIGS. 6A and 6B is employed for first retaining member 39 and the plate member shown in FIGS. 7A and 7B is employed for second retaining member 45, the rigidity of second retaining member 45 is greater than that of first retaining member 39. Accordingly, the natural frequency of second assembly 52 is greater than that of first assembly 51. As a result, even when fluorescent wheel unit 24 and color wheel unit 25 are driven to generate vibrations, resonance is less likely to occur.

First and second retaining members 39 and 45 may be designed such that the natural frequency of second assembly 52 is smaller than that of first assembly 51.

In other words, first and second retaining members 39 and 45 are determined such that the natural frequency of first assembly 51 including fluorescent wheel unit 24 is not equal to that of second assembly 52 including color wheel unit 25. Thus, first and second retaining members 39 and 45 are not limited to those shown in FIGS. 6A, 6B, 7A, 7B, 8A, and 8B.

On the other hand, when the mass of fluorescent wheel unit 24 is very different from that of color wheel unit 25 or where the number of rotations of fluorescent wheel 37 is very different from that of color wheel 43, first and second retaining members 39 and 45 may have the same structure. The reason for this is because, even when first and second retaining members 39 and 45 have the same structure, the natural frequency of first assembly 51 including fluorescent wheel unit 24 is not equal to that of second assembly 52 including color wheel unit 25.

Next, examples of connecting damper 49 will be described with reference to FIGS. 9 to 12. FIGS. 9 to 12 are perspective views each showing an example of connecting damper 49.

Figure 9:
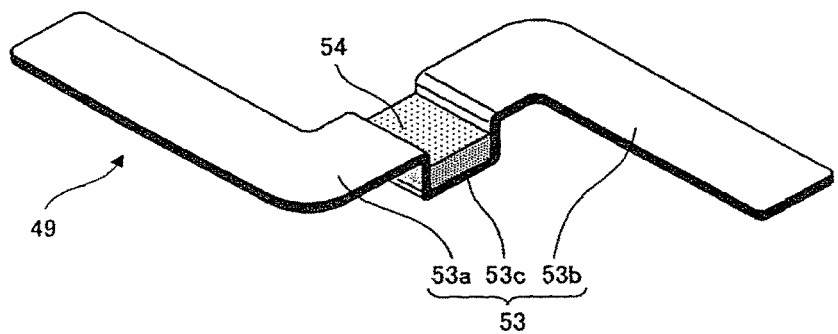
FIG. 9 is a perspective view showing an example of the connecting damper.

Connecting damper 49 shown in FIG. 9 includes plate spring 53 and visco-elasticity member 54 fixed to plate spring 53. Plate spring 53 includes two flat plate parts 53a and 53b, and bent part 53c located between two flat plate parts 53a and 53b. Visco-elasticity member 54 is disposed in bent part 53c.

A Visco-Elasticity Material (VEM) forming visco-elasticity member 54 has a relatively large elastic modulus and a damping force that results from internal viscosity at the molecular level. Thus, vibration transmitted to connecting damper 49 can be damped within the range from a relatively low frequency to a relatively high frequency.

Since visco-elasticity member 54 is fixed to plate spring 53 at a position where the amount of deformation is largest, i.e., at bent part 53c, visco-elasticity member 54 undergoes tensile, compressive, or shear deformation in response to deformation of plate spring 53. The vibration energy of plate spring 53 is converted into thermal energy due to the viscosity of visco-elasticity member 54. As a result, the vibration of plate spring 53 is damped.

Figure 10:
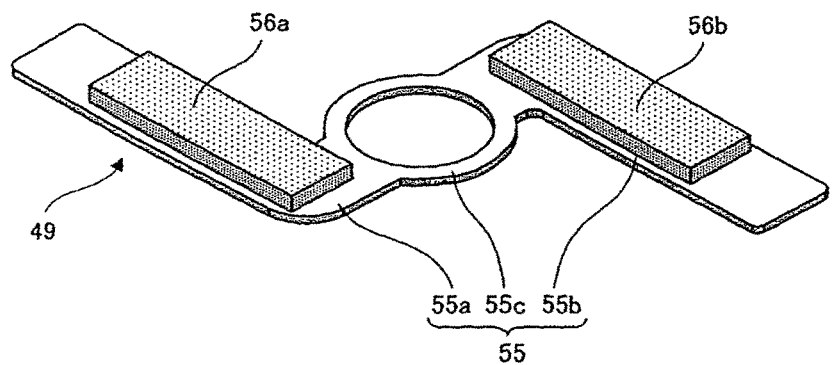
FIG. 10 is a perspective view showing another example of the connecting damper.

Connecting damper 49 shown in FIG. 10 includes plate spring 55 including two flat plate parts 55a and 55b, and ring-shaped flexible part 55c located between two flat plate parts 55a and 55b. Visco-elasticity members 56a and 56b are fixed to flat plates 55a and 55b. Even when shocks (e.g., temporary resonance during a transition period of rotation of motors 38 and 44) are applied to plate spring 53, the shocks are mitigated by ring-shaped flexible part 55c and visco-elasticity members 56a and 56b.

Figure 11:
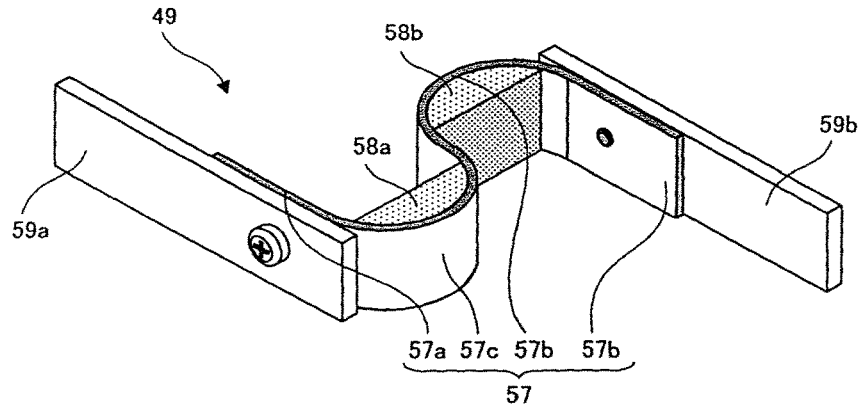
FIG. 11 is a perspective view showing another example of the connecting damper.

Connecting damper 49 shown in FIG. 11 includes plate spring 57 including two flat plate parts 57a and 57b, and two curved parts 57c and 57d located between two flat plate parts 57a and 57b to form an S shape. Visco-elasticity members 58a and 58b are fixed to the insides of curved parts 57c and 57d. Plate spring retaining members 59a and 59b are fixed to two flat plate parts 57a and 57b.

Plate spring 57 is susceptible to vibration in the curved direction of curved parts 57c and 57d. In addition, visco-elasticity members 58a and 58b are arranged at places where tensile, compressive, or shear deformation caused by the vibration concentrates. Accordingly, vibration transmitted to plate spring 57 can be damped.

Though the number of components increases, visco-elasticity members 58a and 58b may be tucked by plate spring 57 using another rigid member (not shown). In such a case, since visco-elasticity members 58a and 58b undergoes compressive or tensile deformation in response to relative deformations between plate spring 57b and the rigid member, the vibration transmitted to plate spring 57 can be further damped.

Figure 12:
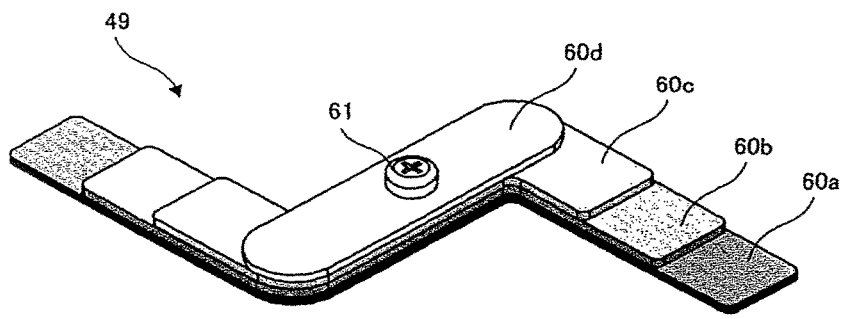
FIG. 12 is a perspective view showing another example of the connecting damper.

Connecting damper 49 shown in FIG. 12 includes plate springs 60a, 60b, 60c, and 60d that each have different sizes. Plate springs 60a, 60b, 60c, and 60d are stacked in a thickness direction, and bundled into a single unit by using fixing screw 61.

Vibration transmitted to plate spring 60a is damped by the friction between the contact surfaces of plate springs 60a, 60b, 60c, and 60d (sliding friction damping). Connecting damper 49 shown in FIG. 12 can withstand a relatively large load because it includes no visco-elasticity material. Thus, connecting damper 49 shown in FIG. 12 is suitably used when a large force is applied to connecting damper 49.

As described above, the performance required of connecting damper 49 includes high rigidity for connecting first retaining member 39 to second retaining member 45, and high damping capability for damping vibrations transmitted from first and second retaining members 39 and 45. Connecting damper 49 is not limited to the examples shown in FIGS. 9 to 12 as long as it has such performance.

Connecting damper 49 is preferably connected to a structure to be damped at a position where the amplitude is largest.

Figure 13:
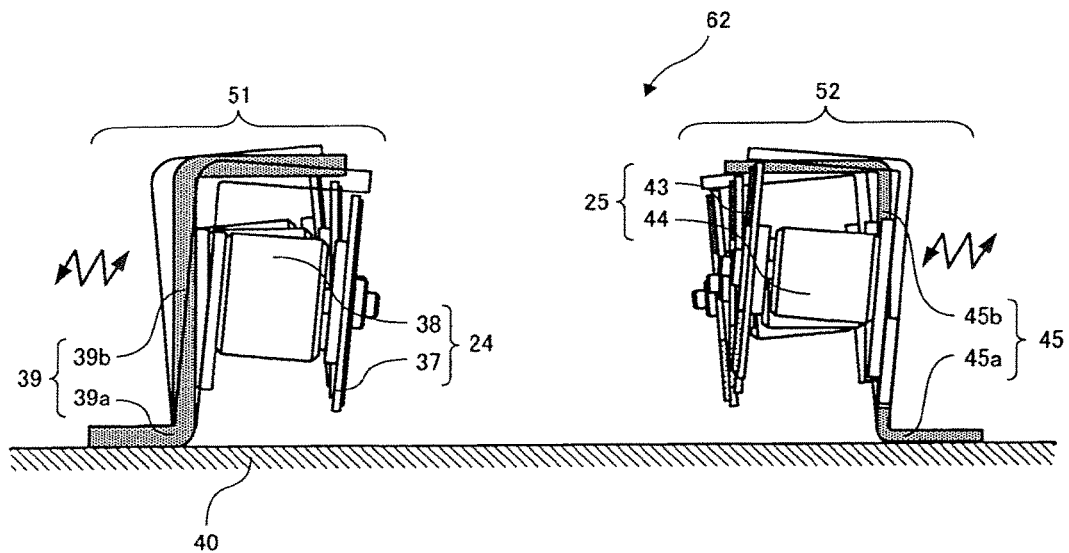
FIG. 13 is a diagram showing the operation of a related vibrating body mounting structure.

The operation of this embodiment will be described with reference to FIGS. 13 and 14.

First, the operation of a related vibrating body mounting structure will be described with reference to FIG. 13. FIG. 13 is a diagram showing the operation of the related vibrating body mounting structure. As shown in FIG. 13, related vibrating body mounting structure 62 includes no connecting damper connecting first retaining members 39 to second retaining member 45.

First retaining member 39 retains fluorescent wheel unit 24 at second portion 39b. First portion 39a of first retaining member 39 is secured to base member 40. Accordingly, due to the vibration of fluorescent wheel unit 24, second portion 39b vibrates around a position adjacent to first portion 39a.

Second retaining member 45 retains color wheel unit 25 at second portion 45b. First portion 45a of second retaining member 45 is secured to base member 40. Accordingly, due to the vibration of color wheel unit 25, second portion 45b vibrates around a position adjacent to first portion 45a.

To synchronize the operations of fluorescent wheel unit 24 and color wheel unit 25, the number of rotations of fluorescent wheel 37 is often made equal to that of color wheel 43. In such a case, the natural frequency of first assembly 51 including fluorescent wheel unit 24 may be equal to that of second assembly 51 including color wheel unit 25.

When the natural frequency of first assembly 51 is equal to that of second assembly 52, the vibrations of fluorescent wheel unit 24 and color wheel unit 25 resonate with each other to be amplified.

When fluorescent wheel unit 24 and color wheel unit 25 vibrate with relatively large amplitude, louder noise may be generated. The amplified vibration may also damage color wheel 43 and motors 38 and 44, resulting in the shortening of the life cycle of the projection-type image display device.

In particular, when fluorescent wheel unit 24 vibrates with larger amplitude due to the resonance, the position of phosphor 35 (see FIG. 3B) that is irradiated with laser beam 45 (see FIG. 3A) greatly fluctuates in the traveling direction of laser beam 46. As a result, the irradiation spot diameter of laser beam 46 that is adjusted by condenser lens 31 (see FIG. 3A) greatly fluctuates with the passage of time.

When laser beam 46 is applied to phosphor 35 with an irradiation spot diameter that is different from an estimated irradiation spot diameter at the time of designing projection-type image display device 22 due to unintended vibration, fluorescence conversion efficiency decreases with the vibration, thereby reducing screen illuminance or making luminance unstable.

In addition, the energy density of laser beam 46 increase when the irradiation spot diameter of laser beam 46 is reduced due to the vibration of fluorescent wheel unit 24. Depending on how much the energy density increases, phosphor 35 may be thermally damaged (burned), resulting in a failure to project an image of a color corresponding to the phosphor.

Thus, first retaining member 39 according to this embodiment is connected to second retaining member 45 via connecting damper 49. FIG. 14 is a diagram showing the operation of vibrating body mounting structure 48 according to this embodiment.

Figure 14:
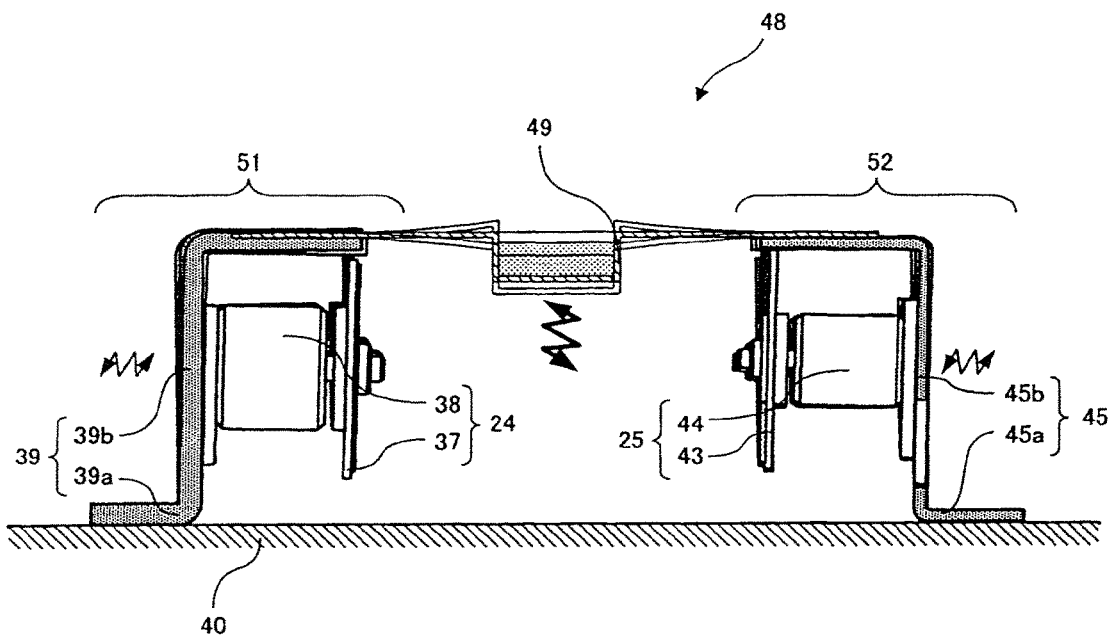
FIG. 14 is a diagram showing the operation of the vibrating body mounting structure according to this embodiment.

As shown in FIG. 14, since first and second retaining members 39 and 45 are connected to each other via connecting damper 49, the vibrations of fluorescent wheel unit 24 and color wheel unit 25 are transmitted to connecting damper 49. The energy transmitted to connecting damper 49 is then converted into thermal energy at connecting damper 49. As a result, the vibrations of fluorescent wheel unit 24 and color wheel unit 25 are reduced.

The structures of first and second retaining members 39 and 45 are more preferably determined such that the rigidity of first retaining member 39 is different from that of second retaining member 45.

Determining the structures of first and second retaining members 39 and 45 in such a manner causes first and second assemblies 51 and 52 to have different natural frequencies. As a result, the vibrations of fluorescent wheel unit 24 and color wheel unit 25 are less likely to resonate with each other. Since first and second assemblies 51 and 52 that each have different natural frequencies are connected to each other via connecting damper 49, one vibration works as a force to limit the other vibration, thereby further reducing each of the vibrations.

When there is a relatively large difference between the number of rotations of fluorescent wheel 37 and that of color wheel 43, even when first and second retaining members 39 and 45 have the same structure, the natural frequency of first assembly 51 is not equal to that of second assembly 52. Accordingly, in this case, first and second retaining members 39 and 45 may have the same structure.

Similarly, when there is a relatively large difference between the mass of fluorescent wheel unit 24 and that of color wheel unit 25, first and second retaining members 39 and 45 may have the same structure. The reason for this is because, even when first and second retaining members 39 and 45 have the same structure, the natural frequency of first assembly 51 is not equal to that of second assembly 52.

In the example shown in FIG. 14, connecting damper 49 shown in FIG. 9 is used. However, connecting dampers 49 shown in FIGS. 10 to 12 may be used. In other words, connecting damper 49 may be any member having the required damping capability.

Now, a vibration control method using a dynamic vibration absorber and a vibration control method using a connecting-type vibration absorber will be described with reference to FIGS. 15 and 16.

Figure 15:
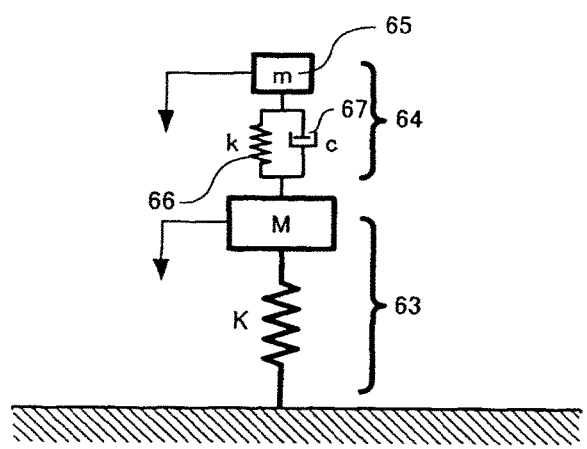
FIG. 15 is a schematic diagram for explaining a method for reducing the vibration of a vibrating body by using a dynamic vibration absorber.

In general, as shown in FIG. 15, as a method for controlling the vibration of single structure 63, a method that uses dynamic vibration absorber 64 is widely employed. Dynamic vibration absorber 64 includes member 65 having a mass m, spring 66 having a spring constant k, and damper 67 having a damping coefficient c.

The mass m, the spring constant k, and the damping coefficient c are determined such that the natural frequency of dynamic vibration absorber 64 is equal to that of single structure 63 having a mass M and rigidity K. Since dynamic vibration absorber 64 is attached to single structure 63, dynamic vibration absorber 64 resonates with the vibration of single structure 63, and the vibration energy of single structure 63 is absorbed by damper 67.

However, the method that uses dynamic vibration absorber 64 has a disadvantage in that, for example, a sufficient damping effect cannot be provided when the natural frequency of single structure 63 shifts even slightly from that of dynamic vibration absorber 64.

The natural frequencies of fluorescent wheel unit 24 and color wheel unit 25 change respectively when the numbers of rotations of fluorescent wheel 37 and color wheel 43 (see FIG. 14) change. Accordingly, even if dynamic vibration absorber 64 is attached to first and second retaining member 39 and 45 (see FIG. 14), the vibrations of fluorescent wheel unit 24 and color wheel unit 25 cannot be sufficiently reduced.

Figure 16:
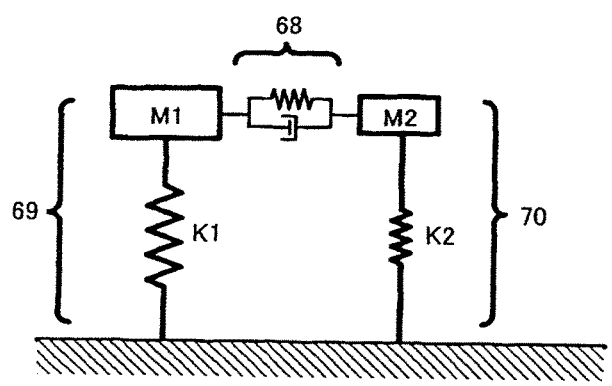
FIG. 16 is a schematic diagram for explaining a method for reducing the vibration of the vibrating body by using a connecting-type vibration absorber.

According to a method for reducing vibration by using connecting-type vibration absorber 68 shown in FIG. 16, structures 69 and 70 are connected to each other via connecting-type vibration absorber 68. When the natural frequency of structure 69 is different from that of structure 70 and when both structures are connected to each other via connecting-type vibration absorber 68, the vibration of structure 69 works as a force to limit the vibration of structure 70. In contrast, the vibration of structure 70 works as a force to limit the vibration of structure 69.

In other words, two structures 69 and 70 that each have different natural frequencies use their own vibrations to reduce vibration by the other. By increasing the difference in natural frequency between structures 69 and 70, a sufficient damping effect can be obtained at a wider frequency band.

Connecting-type vibration absorber 68, as used herein, corresponds to connecting damper 49 of the present invention (see FIG. 14).

In general, when a connecting damper that uses a hydraulic actuator or a motor-driven ball screw mechanism is used, the spring constant and the damping coefficient of connecting-type vibration absorber 68 is determined by a fixed point theory that is used for designing dynamic vibration absorber 64 shown in FIG. 15.

As in the case of connecting dampers 49 shown in FIGS. 9 to 12, when a damping force changes according to the elastic modulus of the VEM and the sliding friction coefficient of the plate spring, adjustment of the damping force is relatively difficult. In such a case, an elastic modulus and a sliding friction coefficient may be determined by a cut-and-try method according to a structure to be damped (fluorescent wheel unit 24 or color wheel unit 25 shown in FIG. 14).

This embodiment has been described by way of example of the projection-type image display device that includes one fluorescent wheel unit 24 and one color wheel unit 25. However, the present invention is not limited to this example. For example, it is obvious that the present invention can be applied to a projection-type image display device that includes two fluorescent wheels or a projection-type image display device that includes two color wheels.

Laser light source 23 (see FIG. 3A) is used as the light source for projection-type image display device 22. However, an extra high pressure mercury lamp may be used.

However, the life cycle of an extra high pressure mercury lamp is relatively short, and thus the light source must be replaced at a relatively high frequency. Furthermore, due to increased concern over protecting the environment, a need has arisen for mercury-free light sources.

For these reasons, a laser light source is preferably used as a light source. Since the life cycle of the laser light source is longer than that of the extra high pressure mercury lamp, the light source replacement frequency can be reduced. In addition, since the laser light source is mercury-free, damage to the environment can be reduced.

Second Embodiment

Next, a vibrating body mounting structure according to a second embodiment of the present invention will be described with reference to FIGS. 17A, 17B, and 18. Hereinafter, only components that are different from those of the first embodiment will be described for ease of explanation.

Figure 17A:
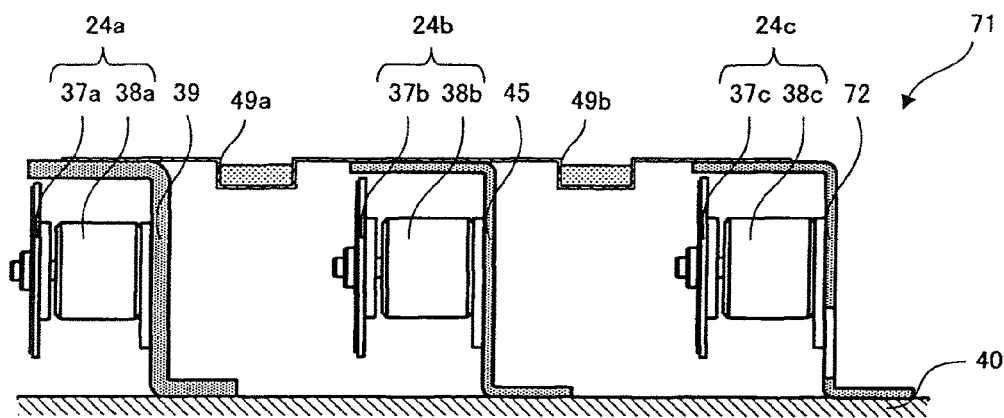
FIG. 17A is a side view showing a vibrating body mounting structure according to a second embodiment of the present invention.

FIG. 17A is a side view showing the vibrating body mounting structure according to this embodiment. FIG. 17B is a plan view of the vibrating body mounting structure shown in FIG. 17A. According to this embodiment, three vibrating bodies that generate vibrations are provided.

A structure that is provided with three vibrating bodies is, for example, a projection-type image display device including two fluorescent wheel units and one color wheel unit. Alternatively, it is a projection-type image display device including three fluorescent wheel units configured to emit lights of different wavelength bands corresponding to three primary colors (red, green, and blue). Hereinafter, the projection-type image display device including three fluorescent wheel units will be described.

Figure 17B:
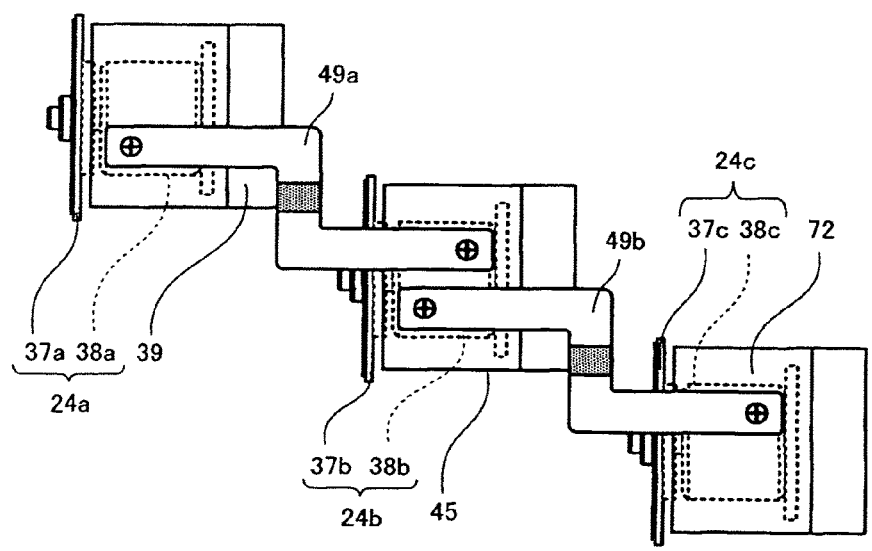
FIG. 17B is a plan view of the vibrating body mounting structure shown in FIG. 17A.

As shown in FIGS. 17A and 17B, vibrating body mounting structure 71 according to this embodiment includes three fluorescent wheel units 24a, 24b, and 24c.

Fluorescent wheel unit 24a includes fluorescent wheel 37a and motor 38a for rotating fluorescent wheel 37a. Fluorescent wheel unit 24a is retained on base member 40 by means of first retaining member 39.

Similarly, fluorescent wheel unit 24b that includes fluorescent wheel 37b and motor 38b for rotating fluorescent wheel 37b is retained on base member 40 by means of second retaining member 45. Fluorescent wheel unit 24c that includes fluorescent wheel 37c and motor 38c for rotating fluorescent wheel 37c is retained on base member 40 by means of third retaining member 72.

Fluorescent wheel units 24a, 24b, and 24c are vibrating bodies that generate vibrations when fluorescent wheels 37a, 37b, and 37c rotate, respectively.

First and second retaining members 39 and 45 are connected to each other via connecting damper 49a. Second and third retaining members 45 and 72 are connected to each other via connecting damper 49b. Connecting dampers 49a and 49b are preferably fixed to positions where the vibration amplitude is largest, i.e., the positions of first, second, and third retaining members 39, 45, and 72 that are the farthest from base member 40.

The vibration energy of first, second, and third retaining members 39, 45, and 72 is transmitted to connecting dampers 49a and 49b to be converted into thermal energy. As a result, the vibrations of fluorescent wheel units 24a and 24b are reduced.

The structures of first, second, and third retaining members 39, 45, and 72 are more preferably determined such that first, second, and third retaining members 39, 45, and 72 are different from each other in rigidity. This makes the vibrations of three fluorescent wheel units 24a, 24, and 24c less likely to resonate with each other.

Since fluorescent wheel units 24a, 24, and 24c are connected to each other via connecting dampers 49a and 49b, the vibration of one fluorescent wheel unit works as a force to limit the vibration of the other fluorescent wheel unit, thereby further reducing each of the vibrations.

When the numbers of rotations of three fluorescent wheels 37a, 37b, and 37c are different from each other, even when first, second, and third retaining members 39, 45, and 72 have the same structure, the vibrations of three fluorescent wheel units 24a, 24b, and 24c do not resonate with each other. Accordingly, in this case, first, second, and third retaining members 39, 45, and 72 may have the same structure.

When there are relatively large differences among the masses of fluorescent wheel units 24a, 24b and 24c, first, second, and third retaining members 39, 45, and 72 may have the same structure. This reason for this is because, even when first, second, and third retaining members 39, 45, and 72 have the same structure, the vibrations of three fluorescent wheel units 24a, 24b and 24c are less likely to resonate with each other.

In the example shown in FIGS. 17A and 17B, connecting damper 49 shown in FIG. 9 is used. However, connecting dampers 49 shown in FIGS. 10 to 12 may be used. Different types of connecting dampers 49a and 49b may be used. In other words, each of connecting dampers 49a and 49b may be any member having the required damping capability.

Figure 18:
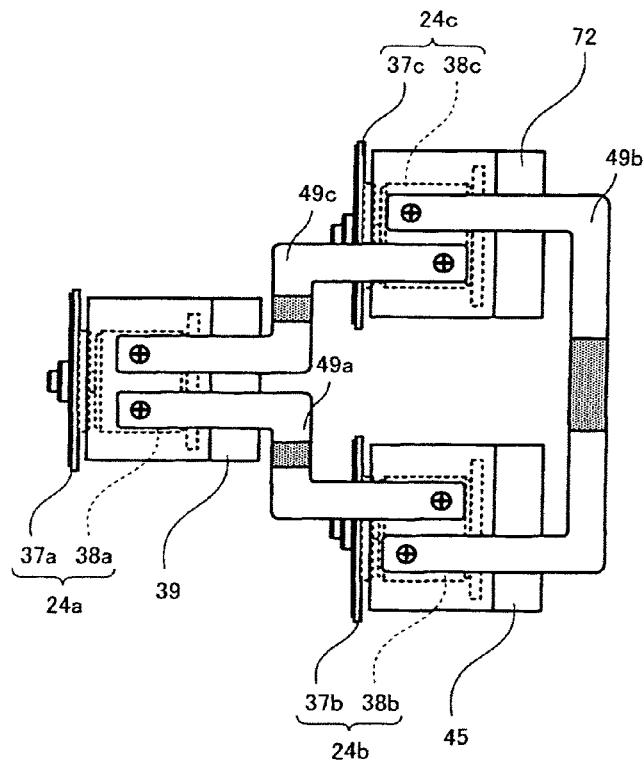
FIG. 18 is a plan view showing a vibrating body mounting structure in which three vibrating bodies are connected to each other.

Depending on the arrangement of first, second, and third retaining members 39, 45, and 72, first and third retaining members 39 and 72 may also be connected to each other via connecting damper 49c, as shown in FIG. 18. By connecting first retaining member 39 to second retaining member 72 via connecting damper 49c, the vibrations of fluorescent wheel units 24a and 24c can be further reduced.

This embodiment has been described by way of example of the structure for mounting the three vibrating bodies (three fluorescent wheel units 24a, 24b, and 24c). However, it is obvious that the present invention can be applied to a structure for mounting four or more vibrating bodies.

Third Embodiment

Next, a vibrating body mounting structure according to a third embodiment of the present invention will be described with reference to FIG. 19. Hereinafter, only components that are different from those of the first and second embodiments will be described.

Figure 19:
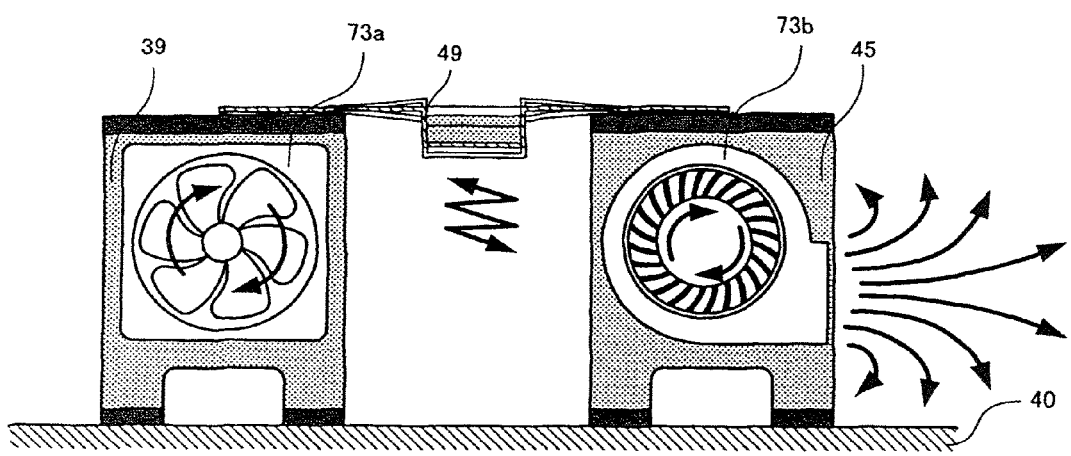
FIG. 19 is a perspective view showing a vibrating body mounting structure according to a third embodiment of the present invention.

FIG. 19 is a side view showing the vibrating body mounting structure according to this embodiment. A vibrating body provided in the vibrating body mounting structure is a fan for blowing air. Examples of the fan include an axial fan and a sirocco.

A projection-type image display device generally includes a fan for blowing air into the projection-type image display device or for discharging air from the projection-type image display device. The fan is used to cool a light source such as a lamp, a LED, or a laser light source, a spatial modulation element such as a DMD or a liquid crystal panel, or a wheel such as a fluorescent wheel or a color wheel. The projection-type image display device may include a plurality of fans.

In the projection-type image display device that includes a plurality of fans, noise generated due to the vibrations of the fans, as well as aerodynamic noise, may cause problems. In particular, when the vibrations of the plurality of fans resonate with each other, louder noise may be generated. This embodiment is intended to reduce noise generated due to the vibrations of the plurality of fans.

As shown in FIG. 19, fan 73a is retained by first retaining member 39, and fan 73b is retained by second retaining member 45. The ends of first and second retaining members 39 and 45 are secured to base member 40, and the other ends of first and second retaining members 39 and 45 are connected to each other via connecting damper 49.

Connecting damper 49 is preferably fixed to first and second retaining members 39 and 45 at positions where the vibration amplitude is largest.

Vibration energy generated when fans 73a and 73b are driven is transmitted to connecting damper 49 to be converted into thermal energy. As a result, the vibrations of fans 73a and 73b are reduced, and noise is decreased.

First and second retaining members 39 and 45 are preferably different from each other in rigidity. This makes the vibrations of fans 73a and 73b less likely to resonate with each other.

In addition, first and second retaining members 39 and 45 are connected to each other via connecting damper 49. Accordingly, the vibration of fan 73a works as a force to limit the vibration of fan 73b, and the vibration of fan 73b works as a force to limit the vibration of fan 73a, thereby further reducing each of the vibrations.

When the number of rotations of fan 73a is different from that of fan 73b, even when first and second retaining members 39 and 45 have the same rigidity, the vibrations of fans 73a and 73b are less likely to resonate with each other. Accordingly, in this case, first and second retaining members 39 and 45 may have the same structure.

When there is a relatively large difference between the masses of fans 73a and 73b, first and second retaining members 39 and 45 may have the same structure. The reason for this is because, even when first and second retaining members 39 and 45 have the same structure, the vibrations of fans 73a and 73b are less likely to resonate with each other.

In the example shown in FIG. 19, connecting damper 49 shown in FIG. 9 is used. However, connecting dampers 49 shown in FIGS. 10 to 12 may be used. In other words, connecting damper 49 may be any member having the required damping capability.

To reduce the vibrations of three or more fans, as in the case of the second embodiment, the fans may be connected to each other via connecting dampers. It is also obvious that similar effects can be expected even in cases where the vibrating body is combined with another structure that generates vibrations, such as a pump that is used when a water cooling system is employed to cool the vibrating body or a speckle reduction device of a laser light source.

Thus, according to the vibrating body mounting structure of the present invention, since a plurality of vibrating bodies such as fluorescent wheel units, color wheel units, or fans are connected to each other via the connecting damper, the vibrations of the vibrating bodies are reduced. According to the projection-type image display device including the vibrating body mounting structure, since the vibrations of the vibrating bodies are reduced, an improvement in the quality of the projected image, noise reduction, and a vibrating body having a longer life cycle can be achieved.

Furthermore, by designing the plurality of vibrating bodies to have different natural frequencies, the vibrations from the vibrating bodies interact with each other, resulting in a more effective reduction of the vibrations.

The preferred embodiments of the present invention have been described. However, the present invention is not limited to the embodiments described above. Various changes understandable to those skilled in the art can be made to the configurations and specifics of the present invention without departing from the scope of the invention.

REFERENCE SIGNS LIST

22 Projection-type image display device
24 Fluorescent wheel unit
25 Color wheel unit
39 First retaining member
40 Base member
45 Second retaining member
48 Vibrating body mounting structure
49 Connecting damper

The invention claimed is:

1. A vibrating body mounting structure for mounting a plurality of vibrating bodies, the vibrating body mounting structure comprising:
a base member;
a plurality of retaining members including first portions secured to the base member, and second portions adjacent to the first portions and retaining the vibrating bodies, the vibrating bodies being spaced apart from each other; and
a connecting damper connecting the second portion of one retaining member of the plurality of retaining members to the second portion of an other retaining member of the plurality of retaining members.

2. The vibrating body mounting structure according to claim 1, wherein natural frequencies of the plurality of retaining members are different from each other.

3. The vibrating body mounting structure according to claim 1, wherein the connecting damper includes a plate spring and a visco-elasticity member fixed to the plate spring.

4. The vibrating body mounting structure according to claim 1, wherein the connecting damper includes a member including a plurality of plate springs that are bundled into a single unit.

5. A projection-type image display device comprising the vibrating body mounting structure according to claim 1, wherein at least one vibrating body of the plurality of vibrating bodies comprises a fluorescent wheel unit including a phosphor, a circular substrate on which the phosphor is applied, and a motor for rotating the circular substrate.

6. A projection-type image display device comprising the vibrating body mounting structure according to claim 1, wherein at least one vibrating body of the plurality of vibrating bodies comprises a color wheel unit including a color filter, a circular substrate on which the color filter is disposed, and a motor for rotating the circular substrate.

7. A projection-type image display device comprising the vibrating body mounting structure according to claim 1, wherein the plurality of vibrating bodies includes a fluorescent wheel unit and a color wheel unit, wherein the fluorescent wheel unit includes a phosphor, a first circular substrate on which the phosphor is applied, and a first motor for rotating the first circular substrate, and
wherein the color wheel unit includes a color filter, a second circular substrate on which the color filter is disposed, and a second motor for rotating the second circular substrate.

8. A projection-type image display device comprising the vibrating body mounting structure according to claim 1, wherein the plurality of vibrating bodies comprises a fan for blowing air.

9. The projection-type image display device according to claim 8, wherein the fan comprises an axial fan.

10. The projection-type image display device according to claim 8, wherein the fan comprises a sirocco fan.

11. The vibrating body mounting structure according to claim 1, wherein the connecting damper spaces apart the vibrating bodies from each other.

12. The vibrating body mounting structure according to claim 1, wherein the vibrating bodies are located on opposing ends of the connecting damper.

13. The vibrating body mounting structure according to claim 1, wherein the connecting damper extends above the vibrating bodies.

14. The vibrating body mounting structure according to claim 1, wherein the first portion of the one retaining member includes a flat plate that longitudinally extends parallel to the base member.

15. The vibrating body mounting structure according to claim 14, wherein the second portion of the one retaining member includes another flat plate that longitudinally extends orthogonal to the base member.

16. The vibrating body mounting structure according to claim 15, wherein one of the vibrating bodies protrudes from said another flat plate of the one retaining member in a direction opposite to a direction that the flat plate of the one retaining member protrudes from said another flat plate of the one retaining member.

17. The vibrating body mounting structure according to claim 16, wherein another one of the vibrating bodies protrudes from the second portion of the other retaining member in the direction that the flat plate of the one retaining member protrudes from said another flat plate of the one retaining member.

18. The vibrating body mounting structure according to claim 17, wherein the connecting damper includes a spring element and a damping element.

19. The vibrating body mounting structure according to claim 18, wherein the spring element includes a flat plate longitudinally extending above an upper surface of the one of the vibrating bodies in the direction that the one of the vibrating bodies protrudes from said another flat plate of the one retaining member.

20. The vibrating body mounting structure according to claim 19, wherein the spring element further includes a bent part longitudinally extending from an end of the flat plate of the spring element in a direction orthogonal to the direction that the one of the vibrating bodies protrudes from said another flat plate of the one retaining member, and
wherein the damping element is located in the bent part of the spring element.

* * * * *